United States Patent [19]

Botwin et al.

[11] 4,428,293
[45] Jan. 31, 1984

[54] GUN-LAUNCHED VARIABLE THRUST RAMJET PROJECTILE

[75] Inventors: Leo Botwin, Westport; John A. Simpson, Southport, both of Conn.

[73] Assignee: United Technologies Corporation, Hartford, Conn.

[21] Appl. No.: 217,970

[22] Filed: Dec. 19, 1980

[51] Int. Cl.³ .............................................. F42B 15/10
[52] U.S. Cl. .................................. 102/381; 60/270.1; 60/917; 244/3.2 T
[58] Field of Search ............. 244/3.2, 3.1, 3.21, 244/3.22; 102/374–381; 60/270 R, 270 S, 240, 233, 237

[56] References Cited

U.S. PATENT DOCUMENTS

| | | |
|---|---|---|
| 2,504,648 | 4/1950 | Chandler . |
| 2,624,281 | 1/1953 | McNally . |
| 2,989,922 | 6/1961 | Greenwood . |
| 2,995,893 | 8/1961 | Morris et al. ............... 60/270 R |
| 3,002,340 | 10/1961 | Landerman ............... 60/270 R |
| 3,188,019 | 6/1965 | Boutin ............... 244/3.2 |
| 3,208,383 | 9/1965 | Larson ............... 60/270 |
| 4,291,533 | 9/1981 | Dugger et al. ............... 102/374 |

Primary Examiner—Harold J. Tudor
Attorney, Agent, or Firm—Richard P. Lange

[57] ABSTRACT

A gun-launched ramjet projectile follows a classical vacuum ballistic trajectory by maintaining a thrust-drag balance. The thrust of the ramjet is varied by an air door which bleeds air from the duct that leads from the supersonic diffuser at the front of the projectile to the combustion chamber. The control system for the air door includes an actuator and a pair of accelerometers, the output of which is integrated to provide an indication of velocity. The first accelerometer operates during the launching of the projectile in the gun to measure the launch velocity. A second, and more sensitive, accelerometer measures in-flight velocity changes due to atmospheric conditions. Both of the measured velocities are compared with prerecorded standards and error signals are derived representing any velocity deviations. These error signals are combined and then used to drive the air doors which varies the thrust of the ramjet so that it follows the classical vacuum ballistic trajectory.

6 Claims, 4 Drawing Figures

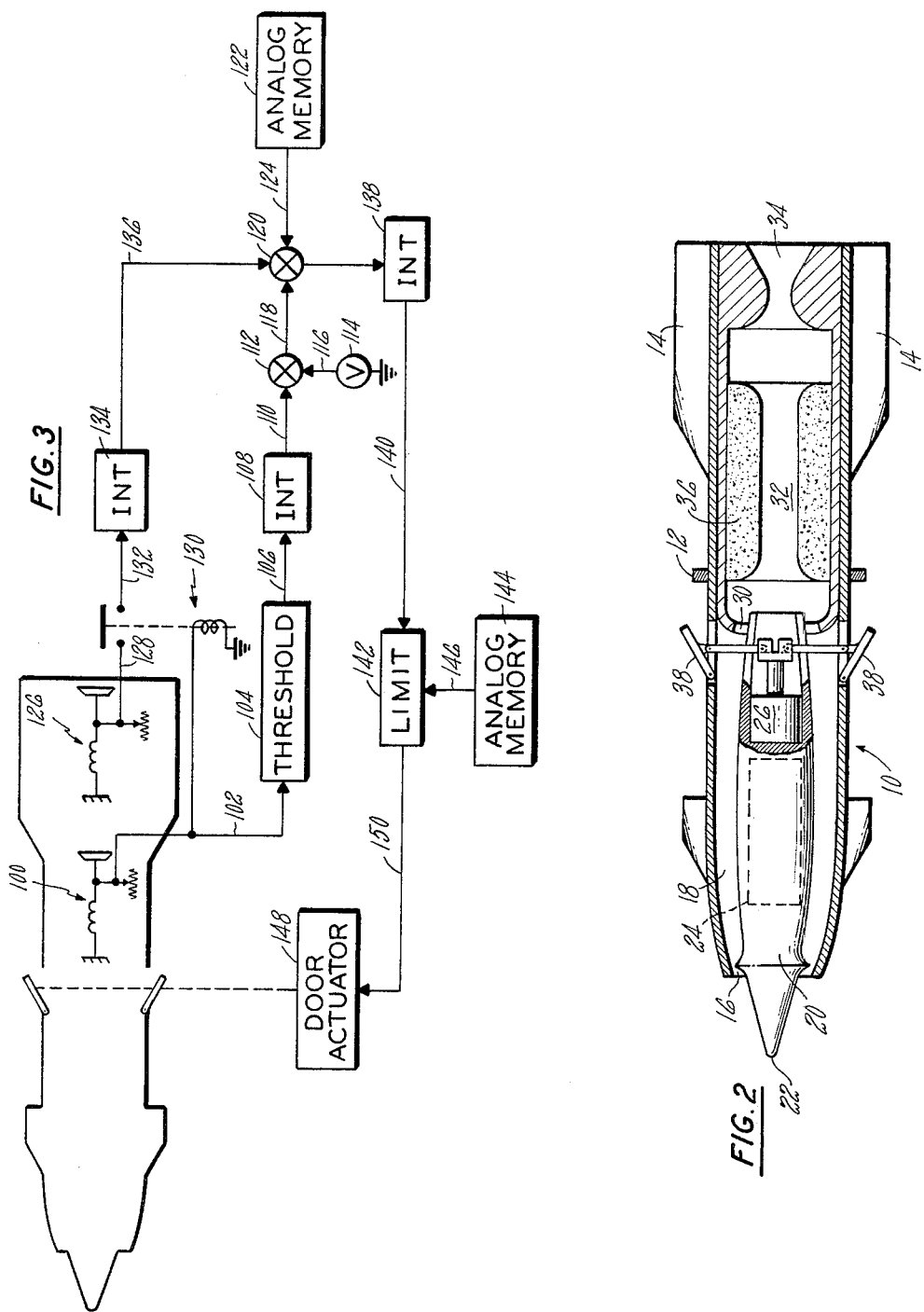

GUN-LAUNCHED VARIABLE THRUST RAMJET PROJECTILE

DESCRIPTION

1. Technical Field

This invention relates to a gun-launched ramjet projectile, and more particularly, to a ramjet projectile that includes means for varying the thrust of the projectile in flight so that it achieves a substantially pseudo ballistic trajectory.

2. Background Art

Ramjet propulsion devices are known generally. Characteristics of ramjets have been utilized in numerous prior art devices. In general, a ramjet is a type of heat engine which utilizes the velocity of the device through the atmosphere to compress air within a combustion chamber. The air then mixes with a fuel, either solid or liquid, within a combustion chamber. In that the incoming air is compressed, its temperature is raised sufficiently high to initially combust the fuel which continues to burn due to the movement of air through the device. A suitably sized and shaped nozzle is provided at the rear of the combustion chamber and the heated air and products of the combustion pass through the nozzle forming a stream of high velocity gases. The thrust imparted to the projectile is thus the result of the high velocity gases which are exhausted from the nozzle at the rear of the projectile.

A well-known basic problem associated with the use of ramjet engines is that ramjets must operate above a speed of approximately Mach 1.5 in order to be efficient. Mach is a measure of velocity in that it is the velocity of the said object divided by the speed of sound in the ambient air conditions. In fact, ramjets experience their greatest thrust and efficiency in the range of Mach 1.5 to Mach 4.0. The most serious drawback of a ramjet is its inability to produce thrust at zero speed; hence, another method or device must be used in conjunction with the ramjet to provide sufficient initial velocity to the point where the ramjet can take over.

The simplicity and high thrust to weight ratio of a ramjet have caused ramjet propulsion to be of significant interest as an assist to gun-fired projectiles. There is a strong current interest in a gun-fired projectile which has longer range than possible with explosive charges alone. Ramjet propelled gun-launched projectiles are known and are capable of propelling a warhead far beyond the range of a conventional warhead.

Of interest in ramjet propelled projectile is U.S. Pat. No. 2,989,922 issued June 27, 1961 to M. Greenwood et al for "Ramjet Propulsion Device". A number of slightly different embodiments of a ramjet projectile are disclosed. The device includes a supersonic diffuser at the forward end of the projectile for admitting air to a duct assembly. As the air enters the duct, adiabatic compression occurs causing an increase in temperature and a decrease in the velocity of air. The annular duct leads to the combustion chamber where combustion of the fuel occurs adding heat and mass to the already compressed air. Finally, a nozzle at the rear of the projectile converts some of the thermal energy of the hot gases into kinetic energy producing thrust. There is no provision in the ramjet disclosed in the device of Greenwood et al to change the amount of thrust once the projectile is in flight.

Of general interest with respect to projectiles are U.S. Pat. No. 2,624,281 issued Jan. 6, 1953 to J. McNally for "Projectile" and U.S. Pat. No. 2,504,648 issued Apr. 18, 1950 to E. Chandler for "Projectile". Of general interest with respect to guidance systems that sense acceleration is U.S. Pat. No. 3,188,019 issued Jan. 8, 1965 to C. Boutin for "Simplified Internal Guidance System".

DISCLOSURE OF INVENTION

It is an object of the present invention to provide a gun-launched ramjet propelled projectile with variable thrust, and yet is relatively simple to construct but still is highly reliable.

Another object of the present invention is to provide a variable thrust gun-launched ramjet projectile which follows a true vacuum ballistic trajectory and thus can be directed toward distant targets with a high degree of accuracy. A still further object of the present invention is to provide a gun-launched ramjet projectile in which the thrust of the ramjet is varied after launching to compensate for deviations in initial propellant charge or other factors which cause unanticipated initial muzzle velocity deviations.

It is yet another object of the present invention to provide a gun-launched ramjet projectile with variable thrust that can be fired along a true ballistic trajectory, and then the projectile automatically adjusts for any deviations from the initial trajectory.

A feature of the present invention is to provide a gun-launched ramjet projectile which has automatic internal correction means to compensate for launch inaccuracies so that the projectile follows a true ballistic trajectory.

A particular aspect of the present invention relates to achieving a classic ballistic vacuum trajectory by using a gun-launched projectile to obtain an initial projectile velocity, this velocity being measured by a first accelerometer, and then controlling the thrust of a ramjet with a second accelerometer to balance out any deviations from the desired trajectory.

According to yet another feature of the present invention, a first accelerometer, or other device such as a velocimeter, in a gun-launched ramjet projectile measures muzzle velocity and initially biases the thrust of ramjet. A second accelerometer is provided to balance drag during flight to obtain the pseudo vacuum trajectory with a weathercock stable projectile eliminating the need for a gyro, or the like, to stabilize the projectile in flight.

According to another aspect of the present invention a pair of accelerometers are provided in a gun-fired ramjet projectile so that a classic ballistic vacuum trajectory is obtained. The first accelerometer integrates firing acceleration to determine initial muzzle velocity and sets an initial thrust bias to either increase or decrease projectile velocity from its muzzle velocity. The second accelerometer is more sensitive than the first accelerometer and is used in flight to vary the thrust setting as the projectile is subjected to wind or the like, in such a manner that the projectile follows a classical vacuum ballistic trajectory.

According to yet another feature of the present invention, a self-contained control system for a gun-launched, ramjet propelled projectile includes a simple yet reliable pair of accelerometers to control the thrust of the ramjet in flight. The first accelerometer provides a course measurement of velocity by integrating the high initial acceleration during firing, on the order of 10,000 G's. The second accelerometer is for providing a fine velocity adjustment after firing and is disabled while the projectile is in the gun to prevent damage from the high G forces associated with launching. In flight, the second accelerometer varies the thrust of the ramjet to achieve the thrust-drag balanced condition and the weathercock stable projectile follows the vacuum ballistic trajectory.

According to another feature of the present invention, a control system in a gun-launched ramjet projectile employs a double integration technique to achieve a thrust-equal-to-drag balance by averaging out gun and ramjet motor limitations to achieve the desired terminal trajectory.

These and other objects, features and advantages of the present invention will become apparent upon reading the following description and referring to the accompanying drawings.

BRIEF DESCRIPTION OF DRAWINGS

FIG. 2 is a view of a gun-launched ramjet projectile, in cross section, depicting the internal components thereof; and FIG. 3 is a schematic diagram of one embodiment of a control system to vary the thrust of the ramjet in accordance with the present invention.

BEST MODE FOR CARRYING OUT THE INVENTION

Figure 1A:
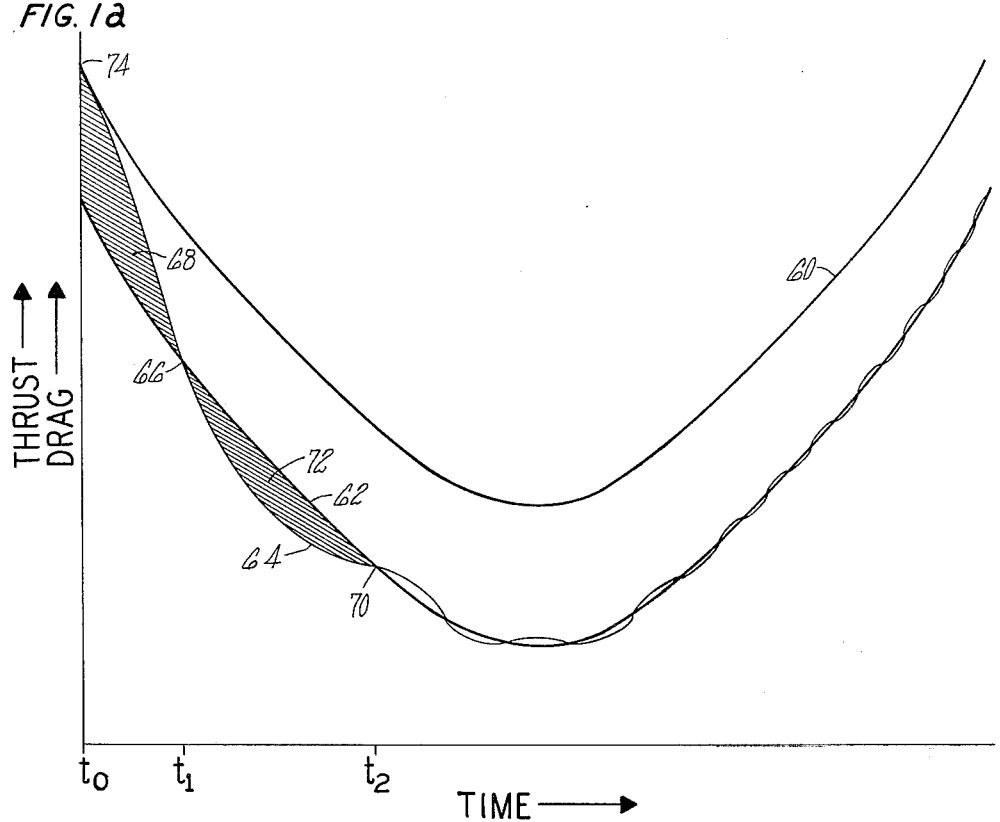
FIG. 1 is a drawing having two parts, FIG. 1a depicting a typical flight of a gun-launched ramjet projectile according to the present invention compared with a classic ballistic trajectory.
FIG. 1b is a graph depicting the thrust and drag characteristics of the ramjet projectile along the same trajectory.

Referring first to FIG. 2, there is seen one embodiment of a gun-launched ramjet projectile according to the present invention. A casing 10 or outer body of the projectile is provided and is sized to the diameter of a conventional projectile to be fired from a launching gun (not shown). An obturator 12 is normally provided, either at the middle section of casing 10 or elsewhere along the sidewall and is a ring-shaped member that deforms into the helical lands within the bore of the gun during firing to seal the propulsion gas. Several fins 14 may be provided and are normally attached to the sidewall near the rear portion of the casing 10. Each fin 14 typically has a folded position against the sidewall of the casing 10 and a deployed position (as shown) in which the projectile is stabilized during flight to have weathercock stability. The casing 10 is essentially a hollow tubular structure of generally cylindrical shape with an annular opening 16 at its front end. An annular duct 18 leads from the opening 16 along the interior of casing 10 to provide air for burning the ramjet fuel, this being described in greater detail hereinafter. At the front of the projectile is a nose 20, and it is generally cylindrical in shape and tapers forwardly to a point 22 at the leading tip of the projectile. As is well known, the nose 20 and the point 22 are so dimensioned and shaped that the shock wave emanating from the point 22 during the flight of the projectile at supersonic speed causes a dramatic increase in the pressure of the air entering the annular opening 16.

Behind the nose 20 is the munition 24 which contains a high explosive charge which could be detonated on impact or in proximity to the target, or alternatively could be another type of payload that is to be carried to the target. As will be appreciated, it should be understood that the term munition or payload would generally refer to a number of devices such as an armor-piercing mass, a gas-containing capsule, a signalling device, or the like. Behind the munition 24 is an equipment module 26 containing the active control components which will be described in greater detail hereinafter.

As mentioned, the annular duct 18 leads from the opening 16 at the front of the projectile to an opening 30 and the combustor section 32 which typically occupies almost the entire rear portion of the casing. As is known, the annular duct 18 constitutes a supersonic diffuser for converting the velocity energy of the incoming air into pressure energy at high temperature. While this is well known, it should be understood that the significance of the annular duct 18 to the present invention is that the incoming high velocity air is slowed to convert the velocity energy into pressure energy and heat near the rear of the passageway just before the air enters the combustor 32.

The combustion chamber 32 typically occupies approximately one-half of the length of the casing 10 and terminates near the back of the ramjet where a nozzle 34 is located. A fuel 36 is positioned along the inner surface of the casing as shown. In operation, the temperature of the air entering the combustion chamber is normally sufficiently high to ignite the fuel 36, or if desired, a separate means for ignition may be used. As the fuel burns, heat is added to the air mass flow which is at substantially constant pressure raising the temperature of the air mass flow. The heated air is then exhausted through the nozzle 34 providing thrust to the projectile.

A particular feature of the present invention relates to one or more doors 38 which are positioned on the casing 10 and when opened, bleed off some of the air from the annular duct 18 before it reaches the combustion chamber 32. It is this bleeding off of the air that changes the thrust of the ramjet as it follows its trajectory, and it is the manner of control that allows the present invention to achieve a high target accuracy as will be more apparent hereinafter.

Figure 1B:
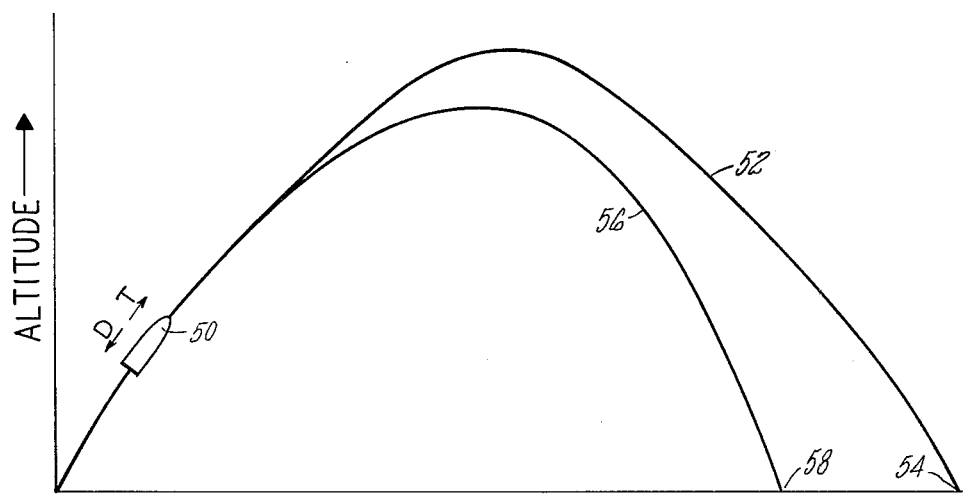

Referring now to FIG. 1, there is seen a drawing (FIG. 1a) depicting thrust-drag balanced projectile 50 in a ballistic trajectory and a drawing (FIG. 1b) depicting the thrust-drag characteristics of the thrust-drag balanced projectile 50 according to the present invention as it follows that trajectory. As is seen in FIG. 1a, a classical vacuum ballistic trajectory, depicted by curve 52, is essentially parabolically shaped and is the path that a ball would follow in a vacuum. In this classical or ideal case, if the initial velocity of the ball or projectile 50 is known, the point 54 at which the projectile strikes the ground can be calculated with a high degree of accuracy. However, as the projectile 50 travels through the atmosphere, there is an inherent drag resulting from air resistance of the projectile 50 moving through the air. Thus, such a trajectory, illustrated by the curve 56, does not follow an ideal parabolic path but begins to fall short and turn a little faster. Accordingly, the curve 56 is lower at its apex than the ideal curve 52 and the projectile 50 would strike the ground at a point 58 which is short of the desired impact point 54. In addition, because the exact atmospheric forces acting on the projectile 50 during its flight cannot be entirely precalculated, the distance separating two impact points, point 54 and point 58, is not precisely known when the projectile 50 is fired.

A particular feature of the present invention is that it employs an active control system which utilizes two velocity measuring devices to control the thrust of the ramjet propelled projectile 50 such that it follows a classic or ideal vacuum ballistic trajectory. In other words, the present invention compensates both for any deviation of initial velocity of the projectile 50 and also for any atmospheric resistance, both anticipated and unanticipated, such that the projectile follows the classic vacuum trajectory, i.e., curve 52 of FIG. 1a, with an extremely high degree of accuracy.

An aspect of the present invention is that the trajectory of a variable thrust ramjet according to the present invention need not include a complex internal navigation system such as one including a gyroscope, or the like, or an external communication system, in order to achieve a highly accurate and predictable trajectory.

Referring now to FIG. 1b, there is seen a graph depicting the thrust and drag characteristics of the projectile 50 as it follows a classical ballistic trajectory, curve 52 of FIG. 1a. The curve 60 represents the thrust of a standard uncorrected ramjet engine of the projectile 50 following a classical ballistic flight path. In other words, this is the maximum available thrust of the ramjet in the projectile 50 following the classical ballistic trajectory. A ramjet projectile according to the present invention is designed to have a drag characteristic which is less than the maximum thrust of the ramjet. In other words, the curve 62 represents the drag of the projectile 50 according to the present invention as it follows a classical ballistic trajectory.

A particular feature of the variable thrust ramjet of the present invention is that a thrust-equal-drag balance is initially achieved and subsequently maintained through an active control system which modulates the door 38 in such a manner that the thrust-drag balance is maintained during flight. Referring still to FIG. 1, the curve 64 represents the modulated thrust of the ramjet projectile 50 as the doors 38 are opened and closed during flight to obtain the thrust-drag balance. It will be noted that as the ramjet projectile 50 leaves the launching gun near time $t_0$, the doors 38 are initially closed and the ramjet is operated at maximum thrust at point 74. The doors 38 are opened, bleeding off air and reducing the thrust from the ramjet until a time $t_1$ when thrust in fact equals drag, this being shown at point 66. The area then separating these two curves, the area 68, is the excess velocity that the ramjet projectile has experienced beyond that required for the thrust-drag balance. The doors 38 are then moved toward their closed position, changing the rate at which thrust reducing air is bled off until $t_2$ when, at point 70, thrust again matches drag. It will be appreciated that if the area 72, which represents excess velocity, is perfectly matched with the area 68 which represents velocity shortage, then the velocity of the ramjet projectile would be exactly as required to achieve the classical ballistic trajectory to curve 52. However, because atmospheric forces cause further changes in the velocity of the projectile, the control system may have to continually modulate the doors 38 to track the drag coefficient, illustrated by curve 64 as the projectile continues its flight.

A feature of the present invention is that the control system for the variable thrust ramjet automatically corrects for any mismatch in the initial firing velocity to ensure that the thrust-drag balance is maintained. For example, still referring to FIG. 1, if the ramjet projectile had been initially fired at the correct velocity, then the area 72 and the area 68 which represent velocity deviations from the desired thrust-drag balanced condition, would be driven to zero. However, if the initial velocity of the projectile was not as expected, either too high or too low, then the control system measures this error and makes velocity change by adding a bias to compensate for the error. Referring next to FIG. 3, there is seen a schematic block diagram depicting one embodiment of a control system according to the present invention for achieving the thrust-drag balance during the flight of the projectile 50. This control system includes a first accelerometer 100 for measuring the initial acceleration of the projectile during launching, that occurring in the bore of the gun. The accelerometer 100 would be selected so as to effectively integrate the acceleration experienced by the projectile when subjected to the high G forces, on the order of 10,000 G's, which the projectile experiences from the forces associated with the exploding gases. The output from the accelerometer 100 is connected by a lead 102 to a threshold device 104. The threshold device essentially passes a signal level which corresponds to a G force of greater than about 5 G's. Because this is a relatively small signal level compared to the overall signal level, only a small amount of velocity error is introduced by the threshold device 104. The output of the threshold device is presented on a line 106 to an integrator 108 which integrates the signal level associated with the acceleration in the launching gun. The output from the integrator 108 is then presented on a line 110 to a summing node 112. As will be appreciated, the signal level on the line 110, as the integral of acceleration, represents the velocity of the projectile 50 as it leaves the bore of the gun. A voltage level from a source 114 is also presented by a line 116 to the summing node 112. The voltage source 14 has its level initially set before firing to correspond the desired initial velocity that the projectile is to achieve in the bore of the gun. The summing node 112 then compares any difference in the signal levels on the lines 110 and 116, and if there is any deviations therebetween, an error signal is presented along a line 118 to a second summing node, sum node 120. In other words, the signal level on the line 118 presented to the summing node 120 is a bias voltage representing the initial velocity deviation, if any, of the projectile 50, from its ideal velocity to achieve the classical ballistic trajectory.

An analog memory unit 122 is also connected to the summing node 120 by a line 124. The analog memory unit 122 is triggered during firing of the projectile and provides an output signal which is profiled according to the ideal velocity versus time curve to obtain the thrust-drag balance. A second accelerometer, 126, is also included in the control system for varying the thrust of the ramjet. The accelerometer 126 is responsive to relatively small variations in acceleration and is adapted to operate once the projectile 50 has been launched to measure changes in in-flight velocity, such as would result from atmospheric forces acting on the projectile, e.g., wind or the like. The accelerometer 126 is connected by a lead 128 to a switch 130. The switch 130 is open during acceleration in the gun but closes after the projectile 50 is launched. The switch 130 is of the type generally known in the art and could be either electrically controlled by connection to the accelerometer 100 or could be mechanically closed.

The switch 130 is connected by a lead 132 to an integrator 134 which integrates in-flight acceleration errors. The output from the integrator 134 is a signal whose level represents any in-flight velocity errors and this signal is also presented to the summing node 120 by a line 136.

The summing node 120 sums the voltage levels on all three of the input lines and presents to a third integrator, integrator 138, a signal that is proportional to the variations in velocity of the projectile 50, along its entire flight path. The integrator 138 presents an output signal which, as will be appreciated, corresponds to the error in distance, if any, of the projectile as it travels along its flight path. This signal is then presented by a line 140 to a limit unit 142 which controls the maximum rate of change of this signal in accordance with a predescribed function of engine time. An analog memory 144 is connected to the control terminal of the limiter 142 by a line 146. The output from the limiter 142 is then presented to a door actuator 148 on a line 150. The door actuator 148 could be a motor or solenoid and is connected to each of the doors 31 (FIG. 2) by mechanical linkage or the like, for moving the doors between their opened and closed positions.

It should be understood that there are a number of methods for thrust control in a ramjet in addition to the modulation of the doors 31 as described in the present invention. For example, the flow of air into the combustion chamber 32 can be modulated in some fashion by restricting the size of the inlet passageways. In addition, there are a wide assortment of simple air valves which could also perform this function, one of which is a piston device that moves against a surface and changes the area of an opening through which air flows.

Although this invention has been shown and described with respect to a preferred embodiment, it will be understood by those skilled in this art that various changes in form and detail thereof may be made without departing from the spirit and scope of the claimed invention.

We claim:

1. A variable thrust ramjet weathercock stable projectile suitable for launching from a gun, comprising:
   a casing having an air inlet which operates as a supersonic diffuser to increase the pressure of air entering said inlet;
   a duct means leading from said inlet to a combustion chamber in which a fuel is burned, a nozzle means positioned in said casing near the rear end of said combustion chamber through which hot gases are exhausted providing thrust to said ramjet;
   bleed means positioned in said casing, and opening into said duct, said bleed means being adjustable between a closed position in which no air is bled from said duct and an opened position in which air is bled from said duct;
   control means connected to said bleed means for moving said bleed means between its opened and closed positions, said control means including means for measuring any error in an initial ideal muzzle velocity imparted to said projectile during launching and for measuring any subsequent velocity deviation from a preselected velocity profile of a ballistic vacuum trajectory; and
   whereby said projectile is maintained in a thrust-drag balance such that it follows a predetermined vacuum ballistic trajectory.

2. A variable thrust ramjet projectile according to claim 1, wherein said projectile includes a first accelerometer which is operative during the period when said ramjet projectile is accelerated to an initial velocity of the gun, and wherein said projectile further includes a second accelerometer which is operative subsequent to said ramjet projectile reaching its operating velocity for measuring any velocity deviations in the subsequent flight.

3. A ramjet projectile according to claim 2, wherein said first accelerometer is connected to an integrator for deriving a signal whose level is indicative of the initial velocity to which said ramjet projectile has been accelerated to, and wherein said control system further includes a preselected reference signal level against which the signal level from said integrator is measured to determine an initial velocity error signal.

4. A variable thrust ramjet projectile according to claim 2, wherein said second accelerometer is capable of measuring small variations in acceleration and is operative after said variable thrust ramjet projectile reaches its initial velocity predetermined standard muzzle velocity to measure any deviations therefrom, and further including an integrator connected to said second accelerometer for providing an output signal whose level is indicative of any in-flight velocity deviations, and further including a memory means for providing a profiled signal whose level varies in a preselected manner to provide a preselected velocity versus time profile related to the pseudo vacuum trajectory of said ramjet projectile, and wherein said signal level indicating the in-flight velocity variations is compared with said profiled signal to provide an in-flight velocity error signal.

5. A variable thrust ramjet projectile according to claim 4, wherein said in-flight velocity error signal is presented to an actuator means for modulating said bleed means in accordance therewith so that said projectile maintains a thrust-drag balance in flight.

6. A variable thrust ramjet projectile according to claim 1, wherein said bleed means includes a door which is pivotally mounted on the sidewall of said casing adjacent the end of said duct means nearest said combustion chamber, and wherein said door member is modulated between an opened and a closed position by an actuator controlled by said control means.

* * * * *